US010755867B2

(12) United States Patent
Cao et al.

(10) Patent No.: US 10,755,867 B2
(45) Date of Patent: Aug. 25, 2020

(54) METHOD OF NEGATIVE ELECTRODE PRE-LITHIATION FOR LITHIUM-ION CAPACITORS

(71) Applicant: The Florida State University Research Foundation, Inc., Tallahassee, FL (US)

(72) Inventors: Wanjun Cao, Tallahassee, FL (US); Jim P. Zheng, Tallahassee, FL (US)

(73) Assignees: FLORIDA STATE UNIVERSITY RESEARCH FOUNDATION, INC, Tallahassee, FL (US); GENERAL CAPACITOR, LLC, Tallahassee, FL (US)

( * ) Notice: Subject to any disclaimer, the term of this patent is extended or adjusted under 35 U.S.C. 154(b) by 0 days.

(21) Appl. No.: 15/489,813

(22) Filed: Apr. 18, 2017

(65) Prior Publication Data

US 2017/0301485 A1    Oct. 19, 2017

Related U.S. Application Data

(60) Provisional application No. 62/323,927, filed on Apr. 18, 2016.

(51) Int. Cl.
| | |
|---|---|
| H01G 11/50 | (2013.01) |
| H01G 11/86 | (2013.01) |
| H01G 11/06 | (2013.01) |
| H01G 11/14 | (2013.01) |

(52) U.S. Cl.
CPC ............ H01G 11/50 (2013.01); H01G 11/06 (2013.01); H01G 11/14 (2013.01); H01G 11/86 (2013.01); *Y02E 60/13* (2013.01)

(58) Field of Classification Search
CPC ........ H01G 11/50; H01G 11/06; H01G 11/14; H01G 11/86
See application file for complete search history.

(56) References Cited

U.S. PATENT DOCUMENTS

| 2011/0217585 A1* | 9/2011 | Wang ............... B32B 37/02 |
| | | 429/145 |
| 2016/0126023 A1* | 5/2016 | Cao ................. H01G 11/06 |
| | | 361/502 |
| 2016/0141596 A1 | 5/2016 | Uhm et al. |
| 2016/0181594 A1 | 6/2016 | Balogh et al. |
| 2017/0062140 A1 | 3/2017 | Zheng et al. |
| 2018/0053930 A1* | 2/2018 | Zhamu ............ H01M 10/0525 |
| 2018/0233297 A1* | 8/2018 | Zhamu ............... H01G 11/06 |

* cited by examiner

*Primary Examiner* — Seahvosh Nikmanesh
(74) *Attorney, Agent, or Firm* — Fox Rothschild LLP

(57) ABSTRACT

The present invention is directed to a method for pre-lithiation of negative electrodes during lithium loaded electrode manufacturing for use in lithium-ion capacitors. There is provided a system and method of manufacture of LIC electrodes using thin lithium film having holes therein, and in particular, to the process of manufacturing lithium loaded negative electrodes for lithium-ion capacitors by pre-lithiating electrodes with thin lithium metal films, wherein the thin lithium metal films include holes therein, and the lithium loaded negative electrodes are manufactured using a roll-to-roll lamination manufacturing process.

11 Claims, 16 Drawing Sheets

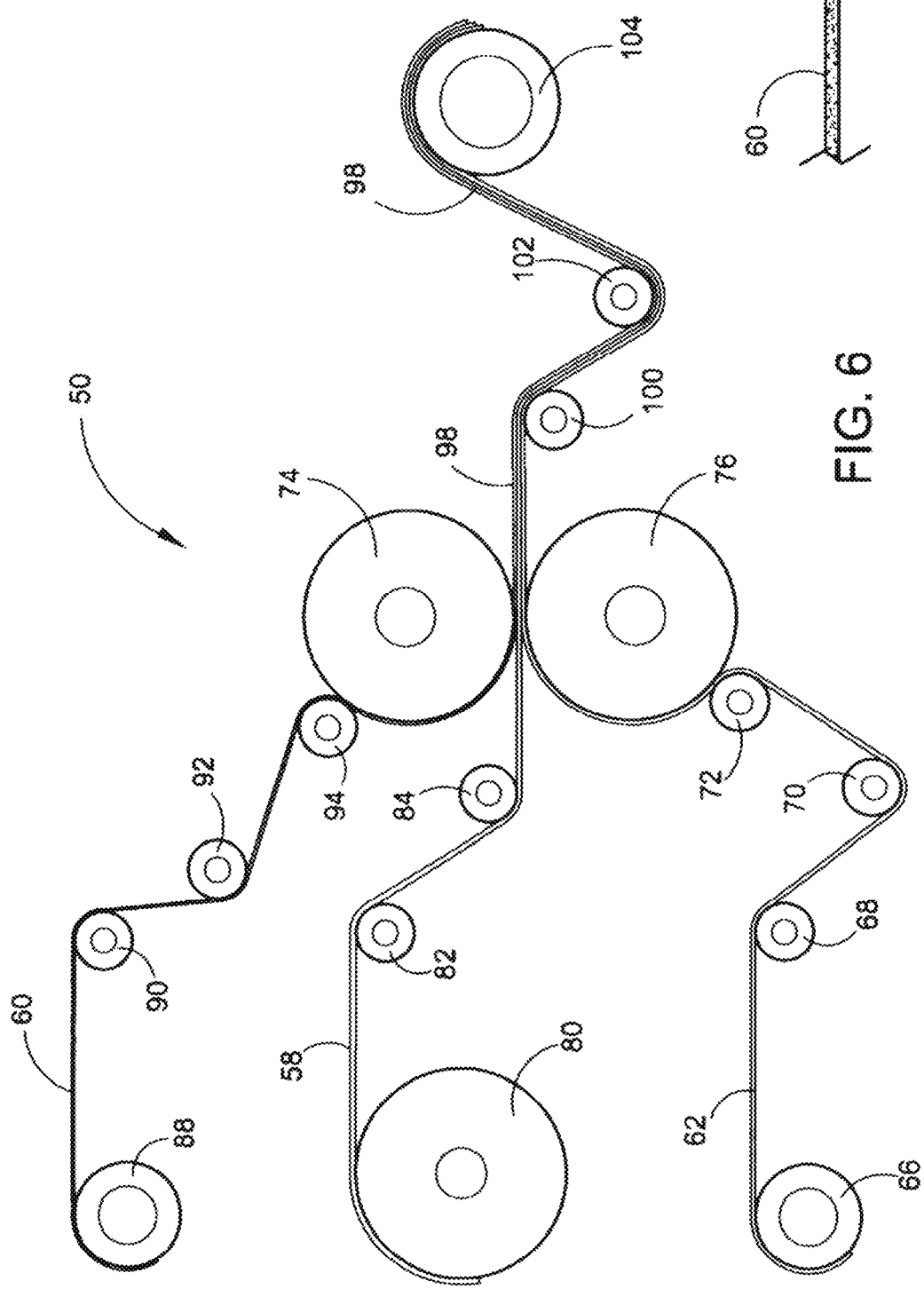

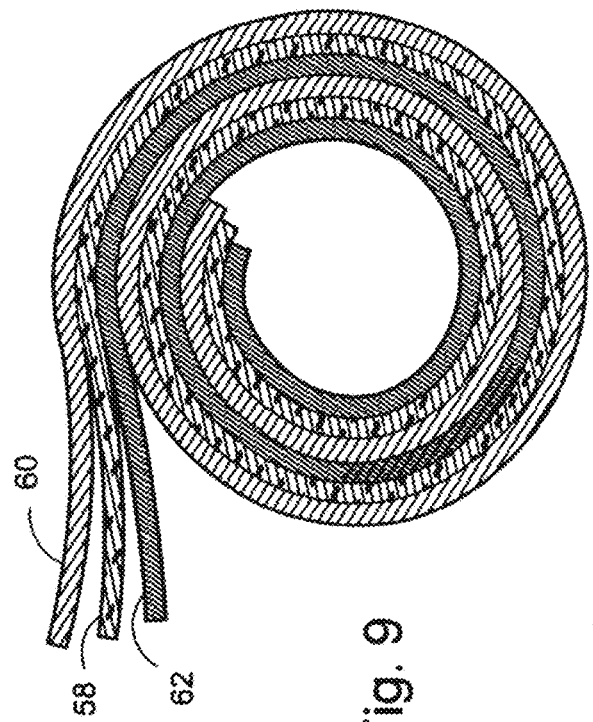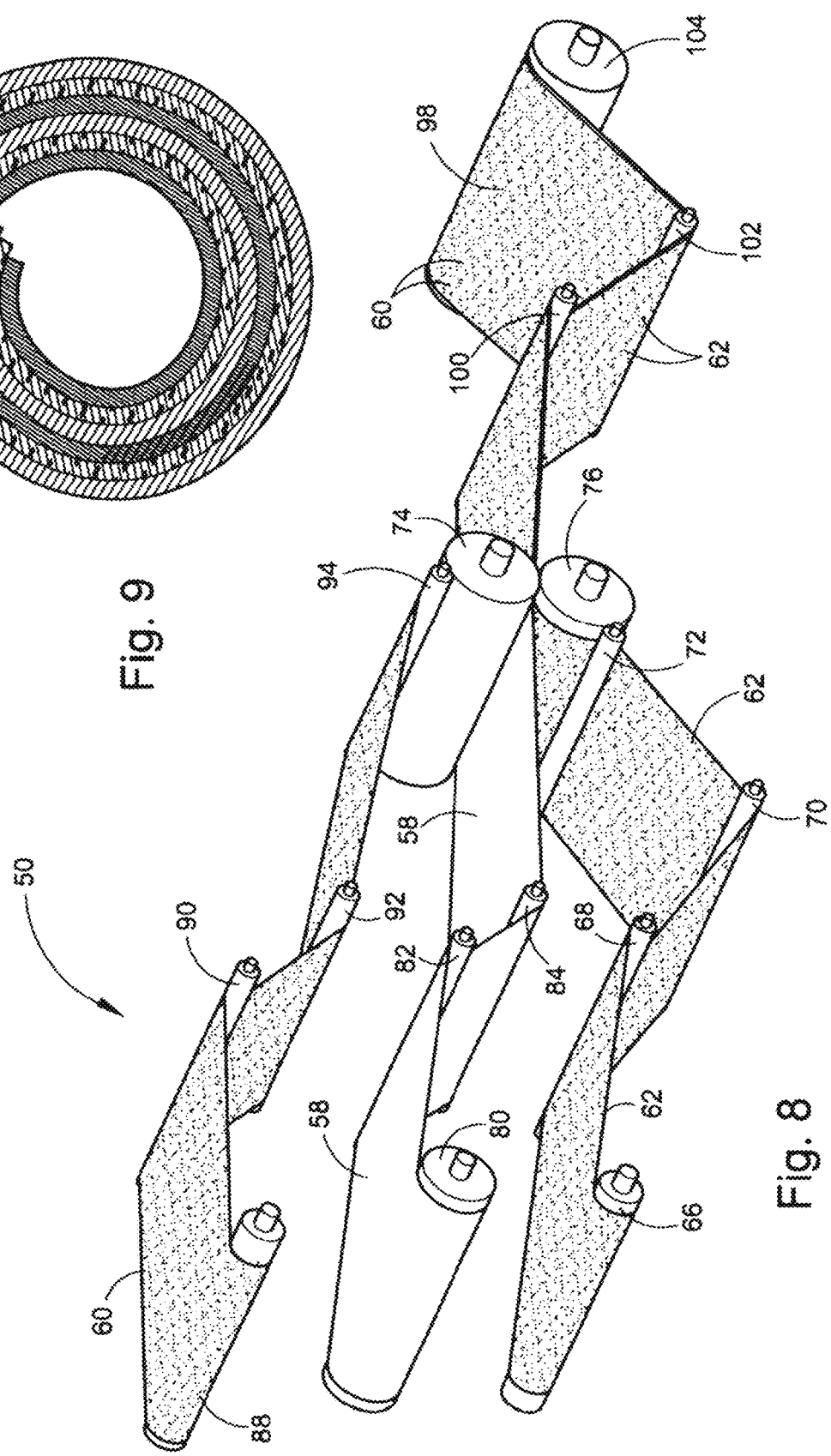

METHOD OF NEGATIVE ELECTRODE PRE-LITHIATION FOR LITHIUM-ION CAPACITORS

STATEMENT REGARDING FEDERALLY SPONSORED RESEARCH AND DEVELOPMENT

This invention was made with government support under contact no. GTS-S-16-037 awarded by General Technical Services: "Advanced High Energy Lithium-ion Capacitors and Hybrid Power Sources for Army Tank and Vehicle Applications Phase I". The government has certain rights in this invention.

FIELD OF THE INVENTION

The present invention relates generally to a method for pre-doping/pre-lithiating thin lithium films with holes into the negative electrodes for lithium-ion capacitors. More particularly, the method for pre-lithiation of the negative electrodes of the present invention, wherein the negative electrode is pre-doped with sufficient lithium sources by loading ultra-thin lithium films having small holes on the surface of the negative electrodes for lithium-ion capacitors.

BACKGROUND OF THE INVENTION

In recent years, considerable research has been focused on the development of a high-energy density electric double layer capacitors (EDLC's), which currently has an energy density of less than 10% of that for Lithium-ion battery (LIB). Among all the energy storage systems that have been investigated and developed in the last few years, Lithium-ion Capacitors (LIC's) have emerged to be one of the most promising because LIC's achieve higher energy density than conventional EDLCs, and better power performance than LIBs as well as being capable of long cycle life. LIC's contain a "pre-lithiated" LIB anode electrode and an EDLC cathode electrode. Fuji Co. proposed using a separate lithium (Li) foil as the third electrode to pre-lithiate the anode electrodes and this LIC structure results an electrochemical energy storage device with three electrodes (cathode, anode, and the sacrificed lithium metal electrode). This three-electrode structure LIC's require the use of the mesh-type current collector for both cathode and anode in order to enable the transportation of the lithium ions into and between the cathode and anode, which makes the cell design complicated and expensive to manufacture.

Three methods of pre-doping lithium into negative electrodes have been developed in our previous patents as shown from FIG. 1 to FIG. 3: Stabilized Lithium Metal Powder (SLMP), Li Pieces and Li Strips. For the SLMP method, the advantages are the following: (1) the Li loading weight can be accurately controlled; (2) there is no damage to the electrodes; (3) it is suitable for mass production of electrodes. The disadvantages for said SLMP method include: (1) there is a high Li reaction speed which may get out of control; (2) there is numerous gas generation after the formation of the LIC cell; (3) there are safety issues for the mass production of the SLMP based LIC's. For the Li Pieces method, the advantages are the following: (1) the Li loading weight can be accurately controlled; (2) there is less gas generation after formation of LIC's; (3) it is safe to produce such Li Pieces based LIC's in a dry room. The disadvantages of such Li Pieces method are: (1) the Li Pieces may damage the electrodes after being pressed onto the surface of the electrodes; (2) it is not suitable for mass production. For the Li Strips method, the advantages are the following: (1) the Li loading weight can be accurately controlled; (2) there is less gas generation after formation of LIC's; (3) it is suitable for mass production for LIC's; and (4) it is safe to produce such Li Strips based LIC's in a dry room. The disadvantages of such Li Strips method are: (1) the Li Strips may damage the electrodes after being pressed onto the surface of the electrodes.

To solve all the above four methods issues, the present invention has been developed. In the present patent, the anode is pre-doped with enough lithium ions by ultra-thin lithium films having small holes loaded on the surface of the negative electrodes as shown in FIG. 4. The small holes in the ultra-thin Li films are very important for the electrolyte penetration into the negative electrodes during the LIC soaking process. Compared with the conventional three-electrode LIC by Fuji Co., a separate lithium electrode is not needed, thereby making the manufacturing process simpler. Compared with the three methods of SLMP, Li Pieces and Li Strips, the method of ultra-thin Li films having holes has the following advantages: (1) there is no damage from thin Li films to the electrodes; (2) it is suitable for LIC mass production; (3) the Li loading weight can be accurately controlled; (4) there is less gas generation after formation of LIC's; and (5) it is safe to mass produce such ultra-thin Li films having small holes based LIC's in a dry room. The only possible disadvantages for present invention are: (1) the ultra-thin Li films are difficult to produce, and (2) the price for such ultra-thin lithium film may be higher. Our future work will be focused on solving these two issues related to present invention.

In this respect, before explaining at least one embodiment of the invention in detail it is to be understood that the invention is not limited in its application to the details of construction and to the arrangement of the components set forth in the following description or illustrated in the drawings. The invention is capable of other embodiments and of being practiced and carried out in various ways. In addition, it is to be understood that the phraseology and terminology employed herein are for the purpose of description and should not be considered to be, or regarded as limiting.

Numerous innovations for the method of negative electrode pre-lithiation have been provided in the prior art in recent years that are described as follows. Even though these innovations may be suitable for the specific individual purposes to which they address, they differ from the present design as hereinafter contrasted. The following is a summary of those prior art patents most relevant to this application at hand, as well as a description outlining the difference between the features of the Method of Negative Electrode Pre-lithiation for Lithium-Ion Capacitors and the prior art.

US pending Patent Application Publication No. 2016/0141596A1 of Uhm et al. provides a method of pre-lithiating a negative electrode, a surface of the negative electrode being lithiated by submerging a roll that is formed by rolling together a negative electrode, and the copper foil, both sides of which are rolled with metallic lithium, in an electrolyte solution.

Wherein this pending patent application publication describes a method of pre-lithiating negative electrode, it does not include the use of thin Li films having holes to be used in the method of negative electrode pre-lithiation or the manufacture of lithium loaded negative electrodes for a lithium-ion capacitor by lamination with a carbon electrode material such as graphite, soft or hard carbon or the like.

US pending Patent Application Publication No. 2016/0181594A1 of Balogh et al. describes methods for pre-lithiating negative electrodes for lithium-ion electrochemical cells. The methods include disposing a lithium metal source comprising a layer of lithium metal adjacent to a surface of a pre-fabricated negative electrode. The lithium metal source and electrode are heated to a temperature of ≥about 100 □. To transfer a quantity of lithium to the pre-fabricated negative electrode. This lithiation process adds excess active lithium capacity that enables replacement of irreversibly lost lithium during cell formation and cell aging, thus leading to increased battery capacity and improved battery life. The methods maybe batch or continuous.

Wherein this pending patent application publication describes the process for lithiating negative electrodes for lithium ion electrochemical cells, it does not include the use of thin Li films having holes to be used in the method of negative electrode pre-lithiation or the manufacture of lithium loaded negative electrodes for a lithium-ion capacitor by lamination with a carbon electrode material such as graphite, soft or hard carbon or the like.

Therefore, none of these previous efforts provides the benefits attendant with the present inventive Method of Negative Electrode Pre-lithiation for Lithium-Ion Capacitors. The present design achieves its intended purposes, objects and advantages over the prior art through a new, useful and unobvious combination of method steps and component elements, as is described in greater detail below.

In this respect, before explaining at least one embodiment of the Method of Negative Electrode Pre-lithiation for Lithium-Ion Capacitors in detail it is to be understood that the method is not limited in its application to the details of construction and to the arrangement of the components set forth in the following description or illustrated in the drawings. The Method of Negative Electrode Pre-lithiation for Lithium-Ion Capacitors is capable of other embodiments and of being practiced and carried out in various ways. In addition, it is to be understood that the phraseology and terminology employed herein are for the purpose of description and should not be regarded as limiting.

SUMMARY OF THE INVENTION

The present invention provides a method for pre-lithiating an ultra-thin lithium film having small holes into the negative electrode for fabricating a lithium-ion capacitor with improved cell performance including energy density, power density, cycle life and DC life. The pre-lithiation method of such lithium pre-doped electrode is simpler than the conventional three-electrode LIC's process and has solved the issues of the three methods of SLMP, Li Pieces and Li Strips.

Another advantage of this invention is to provide a method of pre-lithiating negative electrodes by ultra-thin lithium films having small holes wherein the area of the ultra-thin Li films with small holes is about 25% to about 100% of the area of the negative electrode.

Yet another advantage of this invention is to provide a method of pre-lithiating negative electrodes by ultra-thin lithium films with small holes wherein the thickness of the ultra-thin Lithium film is from about 2 μm to about 50 μm.

A further advantage of this invention is to provide a method of pre-lithiating negative electrodes by ultra-thin lithium films with small holes wherein the percentage of the small holes' area to the ultra-thin lithium films' area is from about 0.01% to about 75%.

Yet a further advantage of this invention is to provide a method of pre-lithiating negative electrodes by ultra-thin lithium films with small holes wherein the negative electrodes can be hard carbon, soft carbon and graphite electrodes.

Another advantage of this invention is to provide a method of pre-lithiating negative electrodes by ultra-thin lithium films with small holes wherein the thickness of the negative electrode is from about 20 μm to about 400 μm.

Yet, another advantage of this invention is to provide a method of pre-lithiating negative electrodes by ultra-thin lithium films with small holes wherein the mass ratio of the Li loading weight to the electrode active layer weight is from about 3% to about 20%.

A further advantage of this invention is to provide a method for lithium loaded electrode manufacturing for lithium-ion capacitors wherein a lithium loaded negative electrode is manufactured using lithium metal thin film having holes in a roll-to-roll process.

A further advantage of this invention is to provide a method for lithium loaded electrode manufacturing for lithium-ion capacitors wherein a lithium loaded negative electrode is manufactured using lithium metal thin film having holes in a roll-to-roll process, wherein there is no adhesive drying time and no heat required on the lamination rolls, the pressure may be adjusted to a specified pressure range.

A further advantage of this invention is to provide a method of lithium loaded electrode manufacturing for lithium-ion capacitors wherein a lithium loaded negative electrode is manufactured using lithium thin film having holes in a roll-to-roll process, which further includes a top lithium film and a bottom lithium film, wherein the locations of said top lithium film and said bottom lithium film are the same on each side of negative electrode.

A further advantage of this invention is to provide a Lithium Ion Capacitor (LIC) laminate cell comprising: a pre-lithiated negative electrode, a positive electrode, a separator, and an organic solvent electrolytic solution with lithium salt as the electrolyte, wherein the pre-lithiated negative electrode is pre-doped with sufficient lithium ions by placing thin lithium sources on the surface of negative electrode.

A further advantage of this invention is to provide a method of negative electrode pre-lithiation for lithium-ion capacitors wherein a lithium loaded negative electrode is manufactured using lithium metal thin film having holes in a roll-to-roll process, wherein the area size percentage range of said holes in lithium films is from about 0.01% to about 75%.

BRIEF DESCRIPTION OF THE DRAWINGS

The accompanying drawings, which are incorporated in and form a part of this specification, illustrate embodiments of the invention and together with the description, serve to explain the principles of this invention.

FIG. 6 is a diagram of the roll with the negative electrode sheet, the top and bottom rolls of the Li foil sheets having holes, the tension rolls, the lamination rolls, the secondary tension rolls and the take up roll;

FIG. 7 is a side view of a section of the Li foil strips illustrating the thickness requirements for same;

FIG. 8 is an illustration, shown in perspective, of a combination of rolls used in the manufacturing process of a lithium loaded negative electrode sheet between top and bottom thin Li films having holes in a mass production operation;

FIG. 9 is a cross section through a segment of the resulting negative electrode sheet between the top and bottom thin Li films having holes;

DETAILED DESCRIPTION OF EMBODIMENTS

Figure 1:
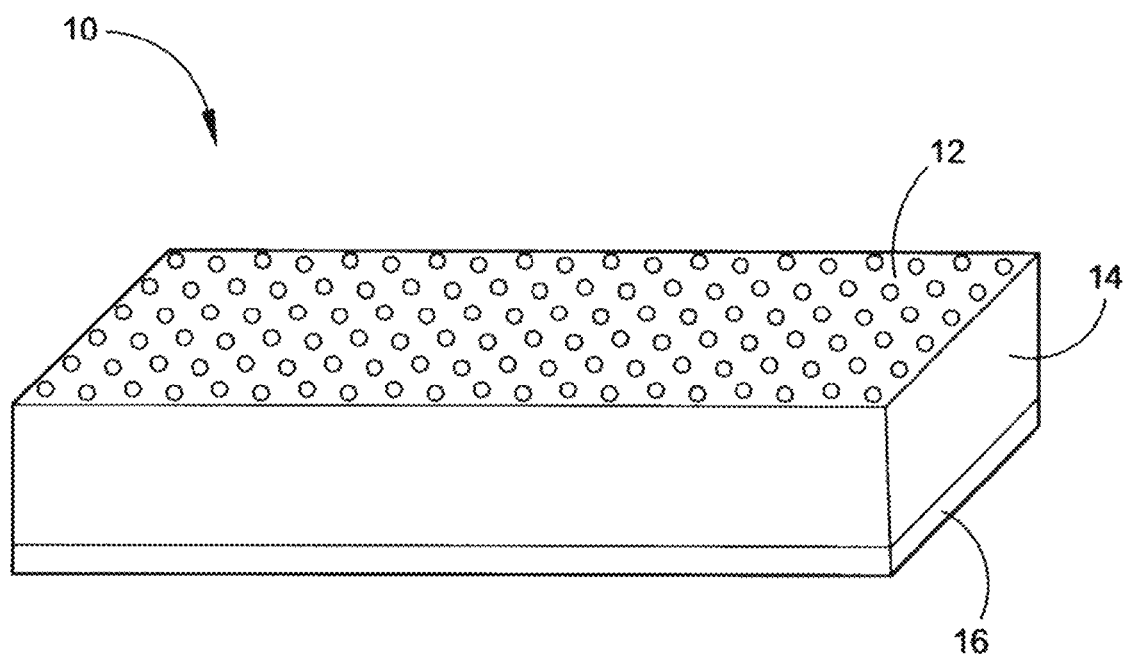
FIG. 1 depicts pre-lithiating a negative electrode with Stabilized Lithium Metal Powder (SLMP)

FIG. 1 depicts pre-lithiating a negative electrode with Stabilized Lithium Metal Powder (SLMP) 10. The negative electrode 14 can be constructed using hard carbon, soft carbon or graphite. This negative electrode 14 is then attached to a copper (Cu) current collector 16 before or during having an SLMP layer 12 coated on the top surface of the negative electrode 14. An advantage of this SLMP pre-lithiation method is it enables accurate control of the Li loading weight during manufacture, it is suitable for mass production of negative electrodes for use in Li-ion capacitors, and there is no damage to the electrodes as they are being mass produced. However, the SLMP may cause numerous gas generation during formation process under high temperature from 65 to 75° C.

Figure 2:
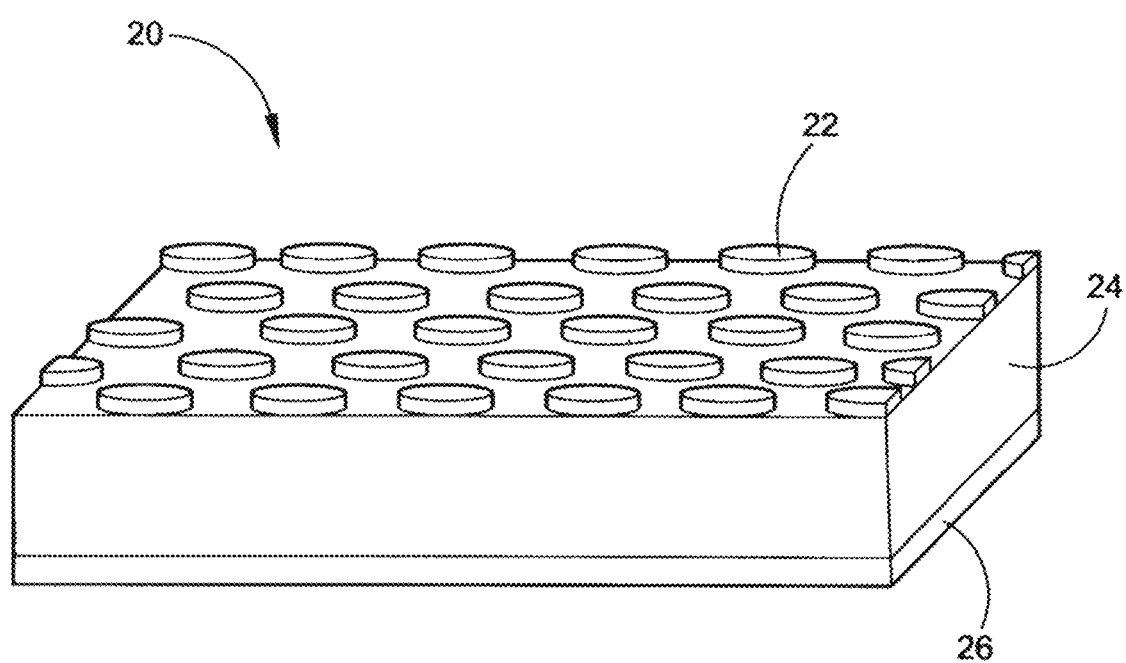
FIG. 2 depicts pre-lithiating a negative electrode with Lithium Metal Pieces.

FIG. 2 depicts pre-lithiating a negative electrode with Lithium Metal Pieces 20. The negative electrode 24 can be constructed using hard carbon, soft carbon or graphite. This negative electrode 24 is then attached to a copper (Cu) current collector 26 before or during having pieces of lithium 22 layered on the top surface of the negative electrode 24. An advantage of this Li metal pieces pre-lithiation method is it enables accurate control of the Li loading weight during manufacture; However, it is not suitable for mass production of lithium loaded negative electrodes for use in Li-ion capacitors, and there is damage to the electrodes as they are being mass produced.

Figure 3:
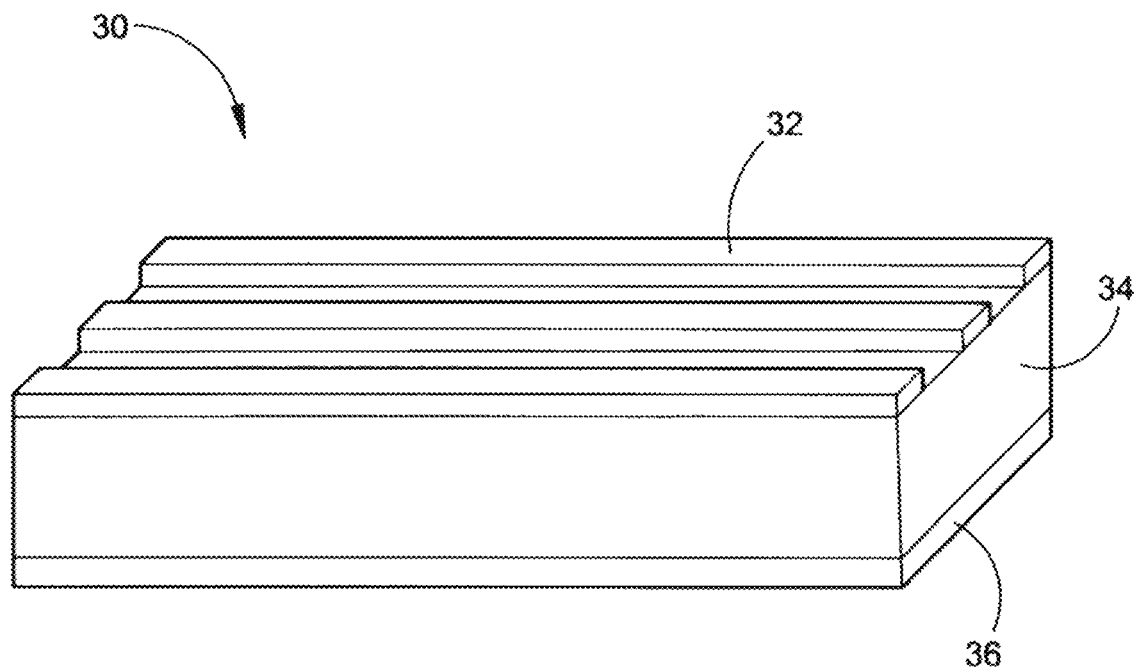
FIG. 3 depicts pre-lithiating a negative electrode with Lithium Metal Strips.

FIG. 3 depicts pre-lithiating a negative electrode with Lithium Metal Strips 30. The negative electrode 34 can be constructed using hard carbon, soft carbon or graphite. This negative electrode 34 is then attached to a copper (Cu) current collector 36 before or during having strips of lithium 32 layered on the top surface of the negative electrode 34. An advantage of this Li metal strips pre-lithiation method is it enables accurate control of the Li loading weight during manufacture and it is suitable for mass production of negative electrodes for use in Li-ion capacitors; However, there is still some damages to the electrodes as they are being mass produced.

Figure 4:
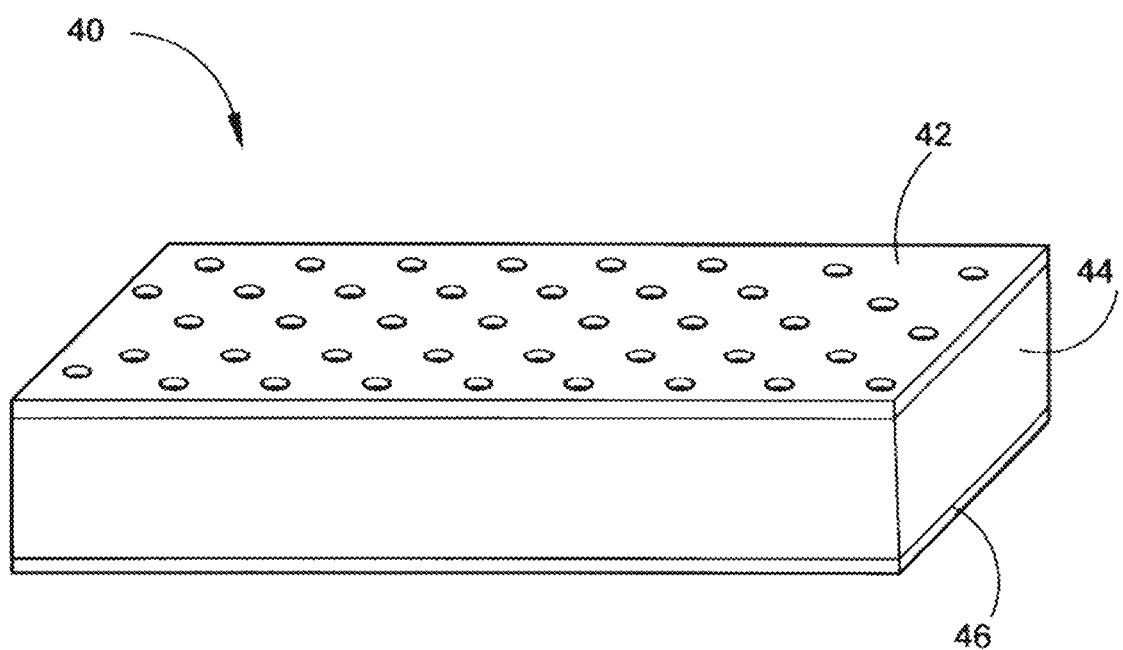
FIG. 4 depicts pre-lithiating a negative electrode with Lithium Metal in the form of a very thin film with small holes throughout the thin film.

FIG. 4 depicts pre-lithiating a negative electrode with Lithium Metal film 40 in the form of a very thin Li film 42 with small holes throughout. The negative electrode 44 can be constructed using hard carbon, soft carbon or graphite. This negative electrode 44 is then attached to a copper (Cu) current collector 46 before or during having a very thin Li film 42 layered on the top surface of the negative electrode 44. This very thin Li film layer 42 is constructed having small holes (as seen here) throughout the film. An advantage of this Li film with small holes pre-lithiation method is it enables accurate control of the Li loading weight during manufacture, it is suitable for mass production of negative electrodes for use in Li-ion capacitors, and there is no damage to the electrodes as they are being mass produced. Additionally, there is less gassing after formation of the lithium-ion capacitor cells by this type of pre-lithiated electrodes.

Figure 5:
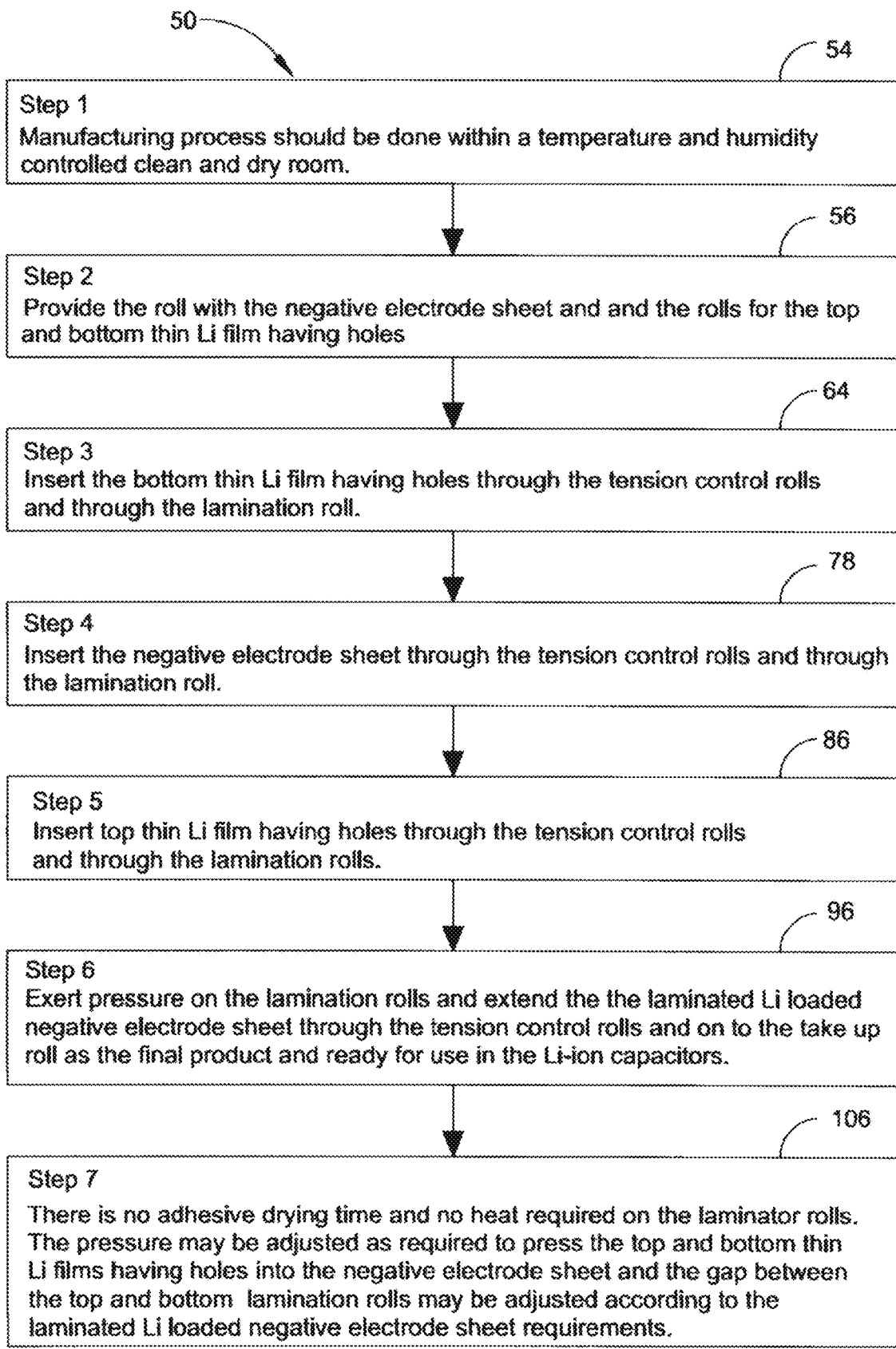
FIG. 5 is a block diagram of the steps for the Process of Lithium Loaded Negative Electrode Manufacturing.

Referring now to the drawings, wherein similar parts of the Method for Negative Electrode Pre-Lithiation for Lithium-Ion Capacitors 50 are identified by like reference numerals, there is seen in FIG. 5 a block diagram that describes the steps for the Method for Negative Electrode Pre-Lithiation for Lithium-Ion Capacitors 50 where:

Step one 54 describes that the manufacturing process should be done in a temperature and humidity controlled clean and dry room.

Step two 56 describes providing the negative electrode sheet 58 (see FIG. 6) and the top thin Li film having holes 60 and bottom thin Li film having holes 62.

Step three 64 describes the feed roll 66 insertion of the bottom thin Li film having holes 62 through tension control rolls 68, 70 and 72 and the lamination rolls 74 and 76.

Step four 78 describes the feed roll 80 and the insertion of the negative electrode sheet 58 through the tension control rolls 82 and 84 and into the lamination rolls 74 and 76.

Step five 86 describes the feed roll 88 and the insertion of the top thin Li film having holes 60 through the tension rolls 90, 92 and 94 and into the lamination rolls 74 and 76.

Step six 96 explains the exertion of pressure on the lamination rolls 74 and 76 and the extension of the laminated Li loaded negative electrode sheet 98 through the tension control rolls 100 and 102 and on to the take up roll 104 to be ready for the use in the Li-ion capacitors.

Step seven 106 explains that there is no adhesive drying time and no heat required on the lamination rolls 74 and 76. The pressure between the lamination rolls 74 and 76 may be adjusted as required to press the top thin Li film having holes 60 and bottom thin Li film having holes 62 into the negative electrode sheet 58 (see FIG. 6) and the gap between the top lamination roll 74 and bottom lamination roll 76 may be adjusted according to the laminated Li loaded negative electrode sheet 98 requirements. The preferred specified pressure range is about 40 to about 400 kg/cm$^2$ as required to press the top Li thin film having holes and bottom Li foil thin film having holes into the negative electrode sheet and the gap between the top and bottom lamination rolls may be adjusted according to the laminated Li loaded negative electrode sheet requirements.

FIG. 6 is a diagram of the Method for Negative Electrode Pre-Lithiation for Lithium-Ion Capacitors 50 with the top thin Li film having holes 60 material feeding into the three tension rolls 90, 92 and 94 and into the lamination rolls 74 and 76.

The feed roll 80 with the negative electrode sheet 58 fed through the tension control rolls 82 and 84 and into the lamination rolls 74 and 76.

The feed roll 66 with the bottom thin Li film having holes 62 fed through tension control rolls 68, 70 and 72 and the lamination rolls 74 and 76.

The pressure is applied with the lamination rolls 74 and 76 and the laminated Li loaded negative electrode sheet 98 passes through the tension control rolls 100 and 102 and on the take up roll 104 to complete the manufacture process Method for Negative Electrode Pre-Lithiation for Lithium-Ion Capacitors 50 and generate a lithium loaded negative electrode ready for use in Li-ion capacitors.

There is no adhesive drying time and no heat required on the lamination rolls, the pressure may be adjusted to a pressure range of 40 to 400 kg/cm$^2$ as required to press the top thin Li film having holes and bottom thin Li film having holes into the negative electrode sheet and the gap between the top and bottom lamination rolls may be adjusted according to the laminated lithium loaded negative electrode sheet requirements. The resulting width range of the manufactured lithium loaded negative electrode is about 2 mm to about 300 mm.

The thickness range of the negative electrode before being loaded with lithium is about 20 μm to about 400 μm. The negative electrode materials used in manufacturing include graphite, hard carbon and soft carbon. The thickness range of the lithium thin films having holes is about 2 μm to about 50 μm. Furthermore, the present Method for Negative Electrode Pre-Lithiation for Lithium-Ion Capacitors 50 method of lithium loaded electrode manufacturing for lithium-ion capacitors, wherein a lithium loaded negative electrode is manufactured using lithium thin films having holes in a roll-to-roll process, according to the instant invention, may include a top lithium thin film having holes and a bottom lithium thin film having holes within the manufactured negative electrode.

FIG. 7 is a side view of a section of the pure thin Li film having holes 60 and 62 illustrating the thickness requirements of about 2 μm to about 50 μm thick. The total thickness range of the negative electrode 58 before being loaded with lithium is about 20 μm to about 400 μm.

FIG. 8 is an illustration of a combination of rolls used in the manufacturing process of a laminated Li loaded negative electrode sheet 98 between top and bottom thin Li films having holes 60 and 62 in a mass production operation. The widths of top and bottom thin Li films having holes 60 and 62 and the width of the negative electrode sheet 58 may vary depending upon the quantity required. The total width range of the negative electrode is about 2 mm to about 300 mm. The total width range of the top and bottom thin Li films having holes is about 2 mm to about 300 mm.

FIG. 9 is a cross section through segment of the negative electrode sheet 58 between the top and bottom thin Li films having holes 60 and 62. The negative electrode materials include graphite, hard carbon and soft carbon.

Example 1

In this Example 1, the Method for Negative Electrode Pre-Lithiation for Lithium-Ion Capacitors 50 was investigated. Lithium-ion capacitor (LIC) contains negative electrodes (NEs), positive electrodes (PEs), separator and lithium source for pre-lithiation of NEs. Activated carbon was used as the active materials of PEs, and hard carbon will be chosen as NEs. The specific capacity of NE is ~372 mAh/g. Pre-lithiation with 99.9% purity Li strips can make cells more stable and safety than using stabilized lithium metal powder (SLMP). However, even this method may take up to 18 h for an electrode to finish the pre-lithiation process. In this Example 1, two pre-lithiation methods for LICs were evaluated, and strip cells were used as control samples and further provided the base for the whole comparison. This research revealed a new method of using 15~20 um Li thin film having holes for pre-lithiation.

During tests, both sandwich LIC cells and 200F LICs were fabricated to demonstrate this new method. As supplementary evidence, DC life and cycle life tests were conducted after initial tests. Thus, 200F LICs using 20 μm Li film having holes for pre-lithiation can achieve higher capacitance (246 F) and lower ESR (19 mOhm) than Li strip cells. High energy and power densities (26.9 Wh/L and 18.3 kW/L) have also been achieved. Moreover, sandwich cells with 20 μm Li thin film having holes has passed 100,000 charge-discharge cycle tests, and their capacitance and ESR can be maintain stable after 1500 h constantly charging at 3.8 V under 65° C.

Highlights of Example 1:

1. Two pre-lithiation methods using 45 μm Li strips and 20 μm Li thin film having holes have been demonstrated in this Example 1.

2. 200F LIC with 20 μm Li thin film having holes has higher capacitance and lower ESR than Li strip cells without holes therein.

3. High energy and power densities have been resulted along with longer life span.

Materials and Methods of Example 1

Figure 10:
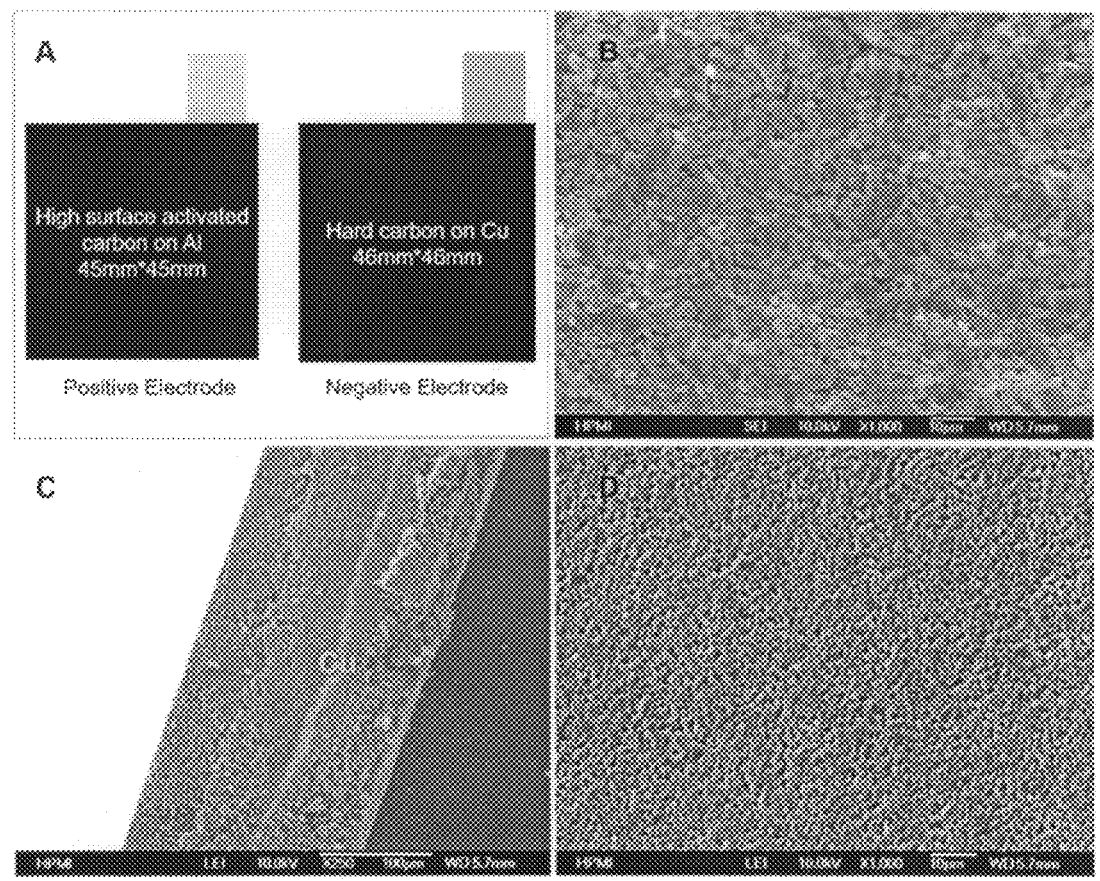
FIG. 10 depicts as follows: A. schema of the punched positive electrode (PE) and negative electrode (NE) with 15 mm*15 mm size tabs; B. high surface activated carbon (active layer of PE); C. cross section of NE with copper as current collector; and D. the surface of hard carbon of NE.

This Example 1 will introduce LICs using high surface activated carbon as PE and hard carbon as NE. Al metal foil (20 μm) was used as PE current collector, while Cu metal foil (10 μm) was NE current collector. PE was cut into 45 mm*45 mm and NE was 46 mm*46 mm. Both have a tab with a 15 mm*15 mm dimension, as shown in FIG. 10A a field emission scanning electron microscope (SEM) (JEM-ARM200cF) was used to observe the surface of electrodes. Scanning voltage was set at 10 KV. SEM images of electrodes' surface and cross section are shown in FIG. 10B-10D. PE activated carbon shows a particle size of 5-10 μm with ~70% porosity. In FIG. 10C, hard carbon was coated on both sides of Cu metal foil (NE current collector) with a single-side coated thickness of 90~100 μm. The total thickness of NE is 190~210 μm. From the observation of NE's surface, hard carbon has a particle size of 2 μm with a porosity of 50%. This feature leaves optimal tunnels for Li particles coming through, which can facilitate the Li diffusion process so that Li-ion can be intercalated into NEs. After the preparation of NEs and PEs, electrodes were dried for 3 h at 150° C. under vacuum. Then, all other fabrication works were done in dry room with −50° C. Dew Point (DP).

Figure 11:
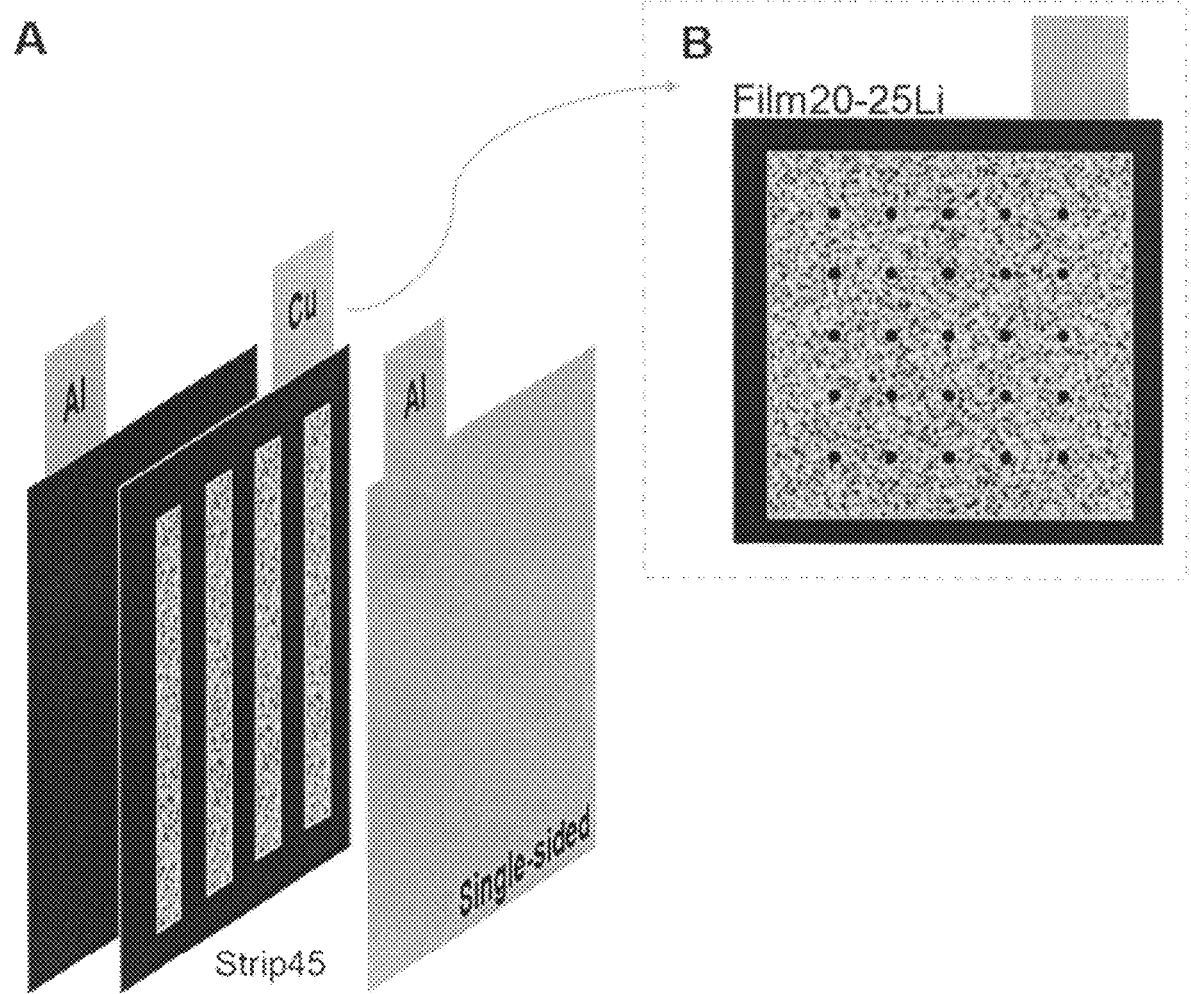
FIG. 11 depicts schematics of sandwich of Li-ion capacitors with 2 different Li pre-lithiation methods as follows: A. sandwich cell with 45 um Li strips loading on NE; and B. NE loaded with 20 um Li thin film (Li film size 40 mm a 40 mm), where 25 holes were drilled on Li thin film for every lithiation.
Figure 12A:
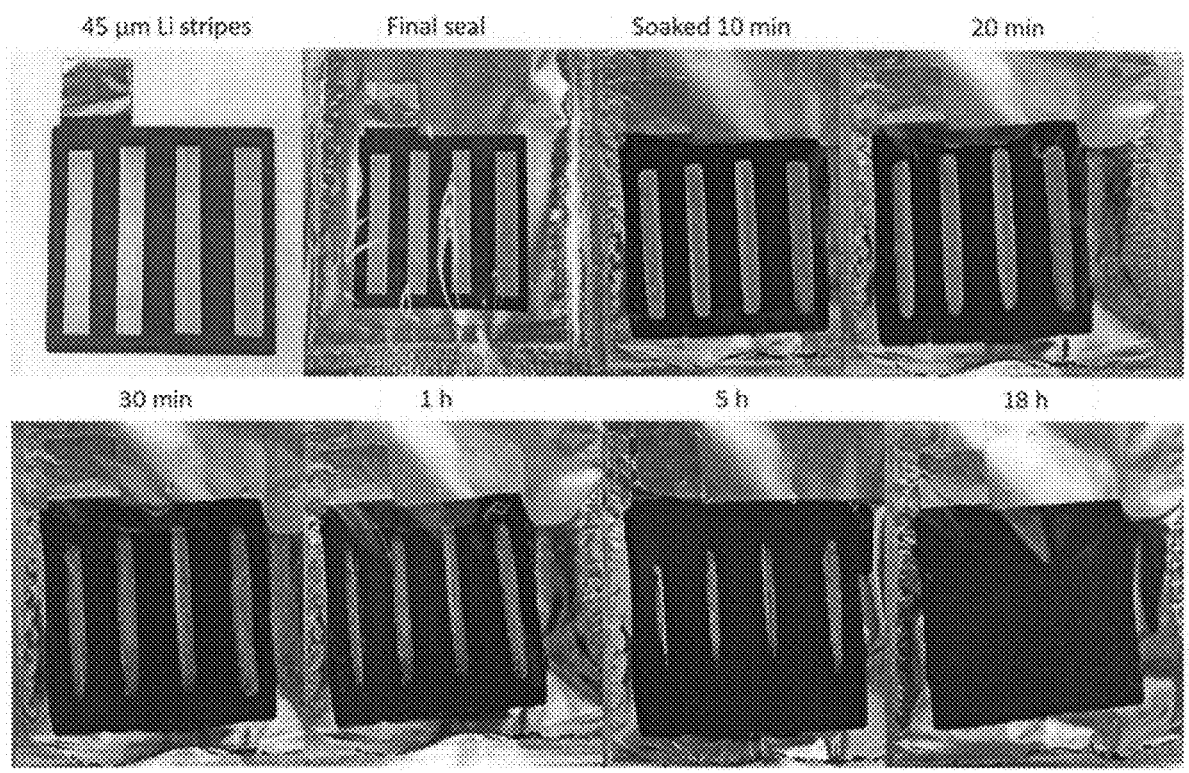
FIGS. 12A and 12B depict photos of the NE pre-lithiation processes with 45 um Li strips, where 12A illustrates during the 18-hours electrolyte soaking period (cell type: Strip45), and 20 um Li thin film having 25 holes, where 12B illustrates during the 2-hours electrolyte soaking period (cell type: Film 20-25Li)

In this Example 1, 2 various pre-lithiation methods will be discussed, and their sketches are shown in FIGS. 11A-11B. The manufacturing process of lithium loaded negative electrodes is described above in FIGS. 1-9. Separator was used to keep electrodes from shorting, which was not shown in the sketch. To first demonstrate 2 different pre-lithiation methods, sandwich cells will be made to compare their capacitance and ESR. Two single-sided PE will sandwich one piece of Li-loaded NE, and two capacitor single cell units will be counted in one cell. FIG. 12A shows the soaking process after impregnated with organic electrolyte with the first pre-lithiation method using 45 μm Li strips, and these cells will be referred to as 'Strip45' in the rest of this example. Li strip used in method 1 has a dimension of 40 mm*4 mm*45 μm. Strip45 will only be used as control sample. The second method is to press Li foil into 20 μm and drill 25 tiny holes on the Li film and directly load 40 mm*40 mm square Li thin films on both sides of NE (referred as 'Film20-25Li', shown in FIG. 12B). Both these 2 different kinds of Li-loaded NEs were sealed in sandwich cells for further testing. Organic electrolyte was used to both soaking process observation and cell formation. Tests include measuring capacitance and ESR, EIS test, DC life and cycle life tests were conducted.

After confirming the optimal pre-lithiation method, we used the method to make 200F LICs to further confirm the improvements on energy and power densities. 200F LICs' structure will be introduced after the discussion sandwich cell in next section. Charge-discharge profiles will also be brought up at the end of this Example 1.

Results and Discussion of Example 1

Figure 12B:
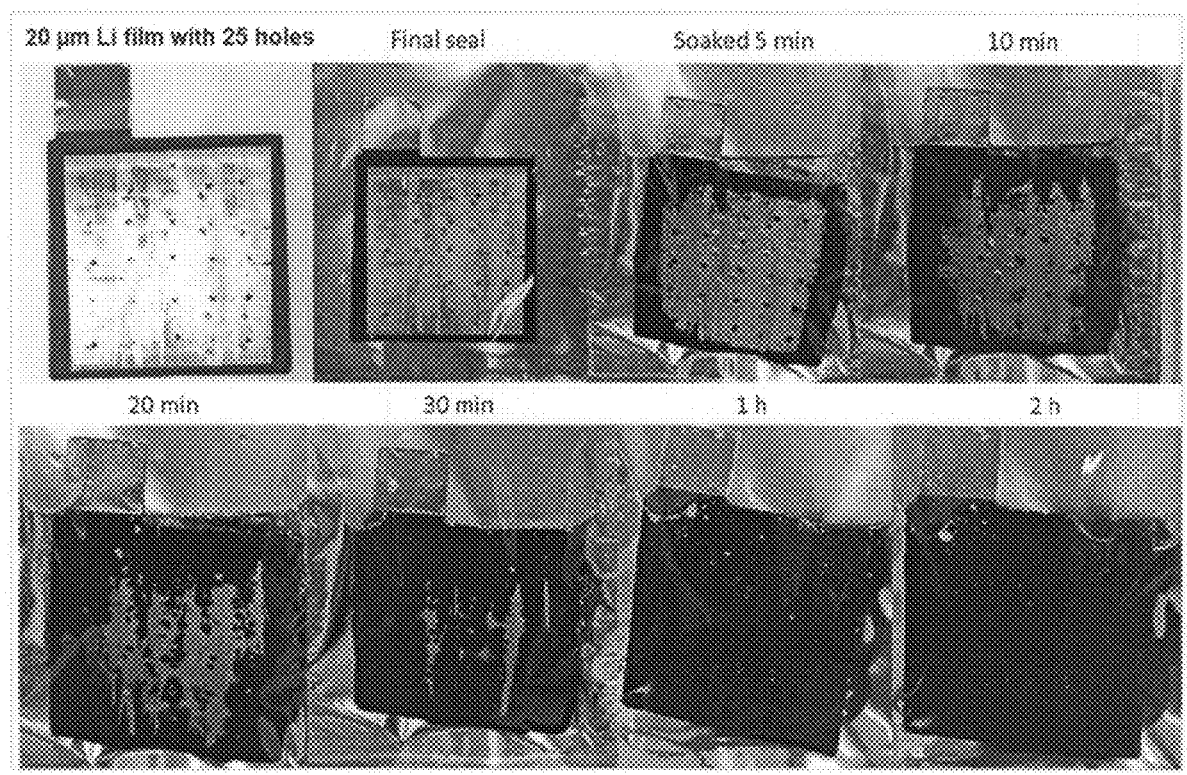

In the last section, SEM image of hard carbon surface has been shown in FIG. 10D. From the picture, 2 μm particles with ~50% porosity were observed. To practically demonstrate the soaking process, 2 hard carbon NEs with different pre-lithiation methods were places in organic electrolyte for hours. Similar experiment of Strip45 has been conducted by our group before, so here we will describe one other critical observation. FIGS. 12A and 12B present the soaking status of Strip45 recorded at cell final seal, soaked for 10 mins, 20 mins, 30 mins, 1 h, 5 h and 18 h, and Film20-25Li recorded at cell final seal, soaked for 5 min, 10 min, 20 min, 30 min, 1 h and 2 h. It is clear that all the lithium for Film20-25Li can be gone after soaked for 2 h, which is much faster than the 18 h of Strip45. From the figure, it can be concluded that hard carbon on NE is the absorbing layer of organic electrolyte. Due to the contact with hard carbon, lithiation progress can be initiated gradually.

Because Li metal is relatively "sticky and soft," as most metals go, the cost of pressing Li foil will be larger with the decrease of thickness. Due to the similarity of all the samples during electrolyte soaking process, cell performance will be the key to identify the optimal pre-lithiation method. As mentioned in Materials and Methods section, NEs with these two different pre-lithiation methods will be placed in between two single-sided activated carbon-based PEs to form sandwich cells. During the tests, the maximum operation voltage is 3.8V and the minimum is 2.2V.

Table 1 below, presents the results of their initial tests. Maxwell electrochemical capacitor calculation method is used in this analysis to get the capacitance and DC-ESR of sandwich cells. Strip45 and Film20-25Li both have good capacitance (>26.9 F), both kinds of cells have similar ESR (0.24~0.27 Ohm). Electrodes' active layers' mass and dimension are used for the calculation of energy and power. Energy related data is based on 1C rate (11.4 mA) tests, while power related data is based on 50C rate (570 mA) tests. Film20-25Li has an energy density of 41.65 Wh/L which can be compared with Strip45. The same trend can be found in the comparison of specific energy, in which Film20-25Li has achieved 58.23 Wh/kg. Film20-25Li has a maximum specific power of 21.72 kW/kg and a maximum power density of 16.2 kW/L. This result shows that, during initial tests, Film20-25Li can compete with Strip45 due to the high capacitance and energy density.

TABLE 1

Summary of LIC cells initial tests for sandwich Li-ion capacitors with two different Li pre-lithiation methods.

| Cell Type | Li Form (Strip/Film) | Li Thickness (μm) | Holes on Li Film | C (F) | ESR (Ohm) | Specific Energy (Wh/kg) | Energy Density (Wh/L) | Max. Specific Power (kW/kg) | Max. Power Density (kW/L) |
|---|---|---|---|---|---|---|---|---|---|
| Strip45 | Strip | 45 | No | 27.5 | 0.24 | 59.22 | 42.11 | 24.33 | 18.04 |
| Film20-25Li | Film | 20 | Yes | 26.9 | 0.27 | 58.23 | 41.65 | 21.72 | 16.20 |

Figure 13A:
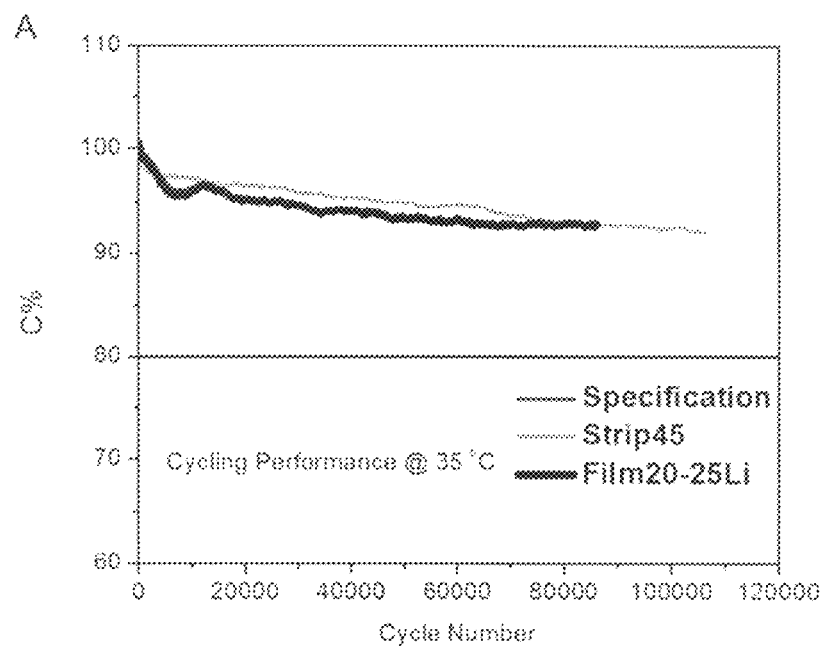
FIGS. 13A, 13B, 13C and 13D depict the cycling performance of 2 kinds of sandwich Li-ion capacitors under a constant current of 570 mA charge-discharge from 3.8 to 2.2V: where 13A depicts capacitance, and 13B depicts ESR percentage change as a function of cycle number; 13C EIS shows results of sandwich Li-ion capacitors with 2 different Li pre-lithiation methods using strips and films; and 13D shows an enlarged figure of 13C above.
Figure 13B:
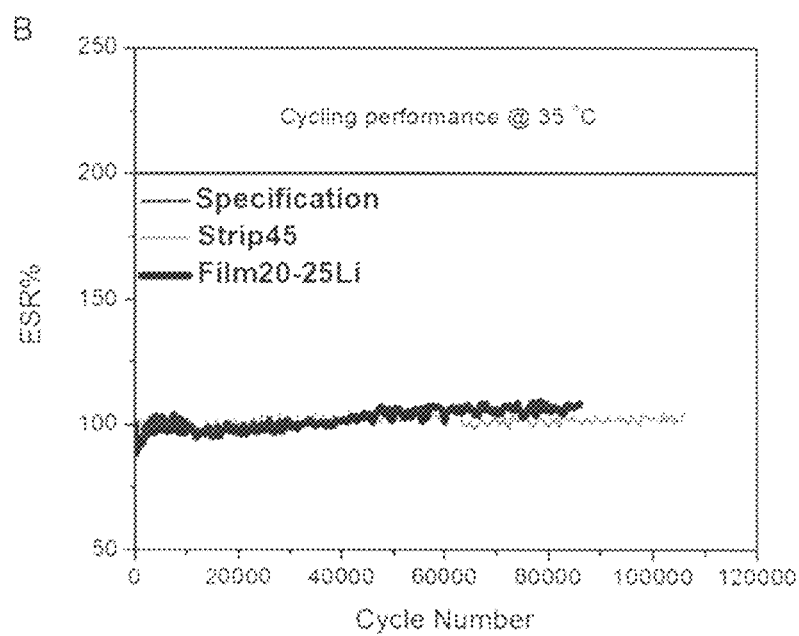

Due to the special configuration of this novel pre-lithiation method, cycle life and DC life tests were conducted to prove cells' electrochemical stabilities. To obtain cycle life data of sandwich cells with different pre-lithiation methods, cells were charged and discharged in the range of 2.2-3.8V continuously. Both charge and discharge currents were 570 mA (50C rate), and all cycling performance was recorded in a 35 degrees Celsius working environment. Capacitance and ESR were calculated for each charge-discharge cycle to compare with initial data, and test results were displayed in FIGS. 13A and 13B. Strip45 cell has passed 100,000 cycles with capacities maintained above 90% of initial tests, besides that Film20-25Li has passed 80,000 cycles due to a late start. Most of these cells can reach a stable stage after an initial drop in capacitance and an initial increase in ESR.

Figure 13C:
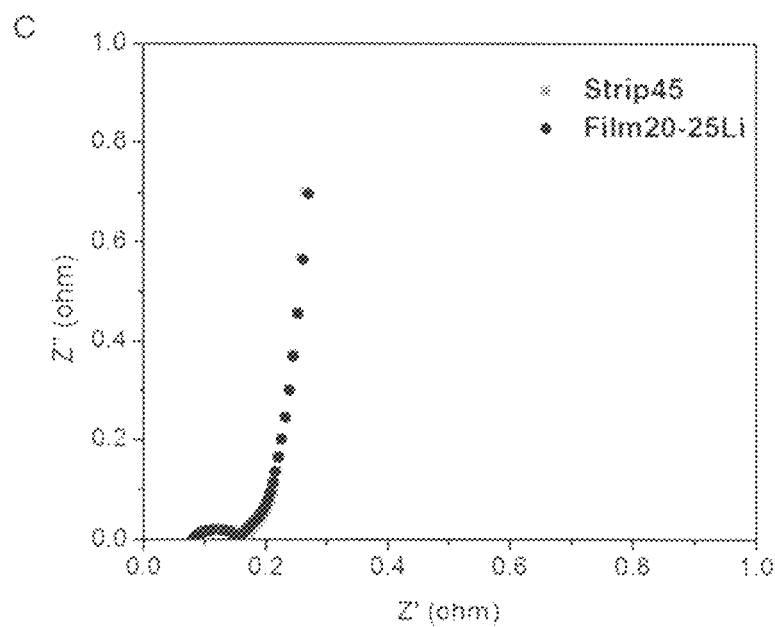
Figure 13D:
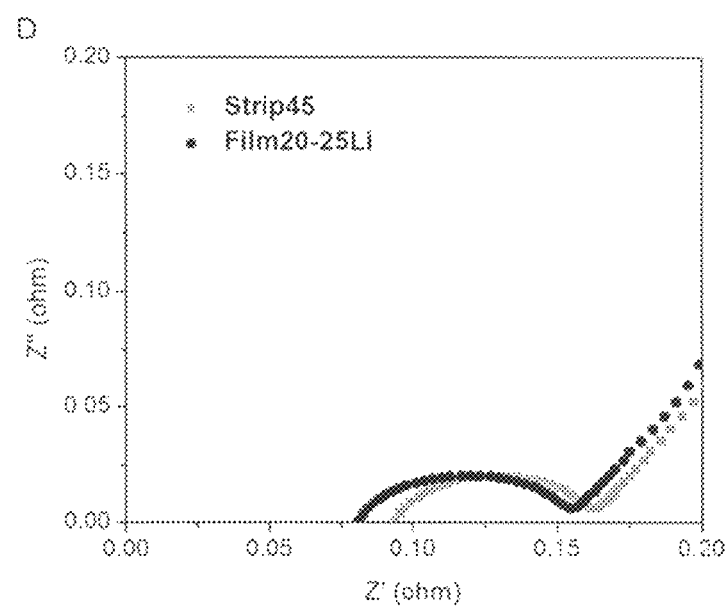
Figure 14:
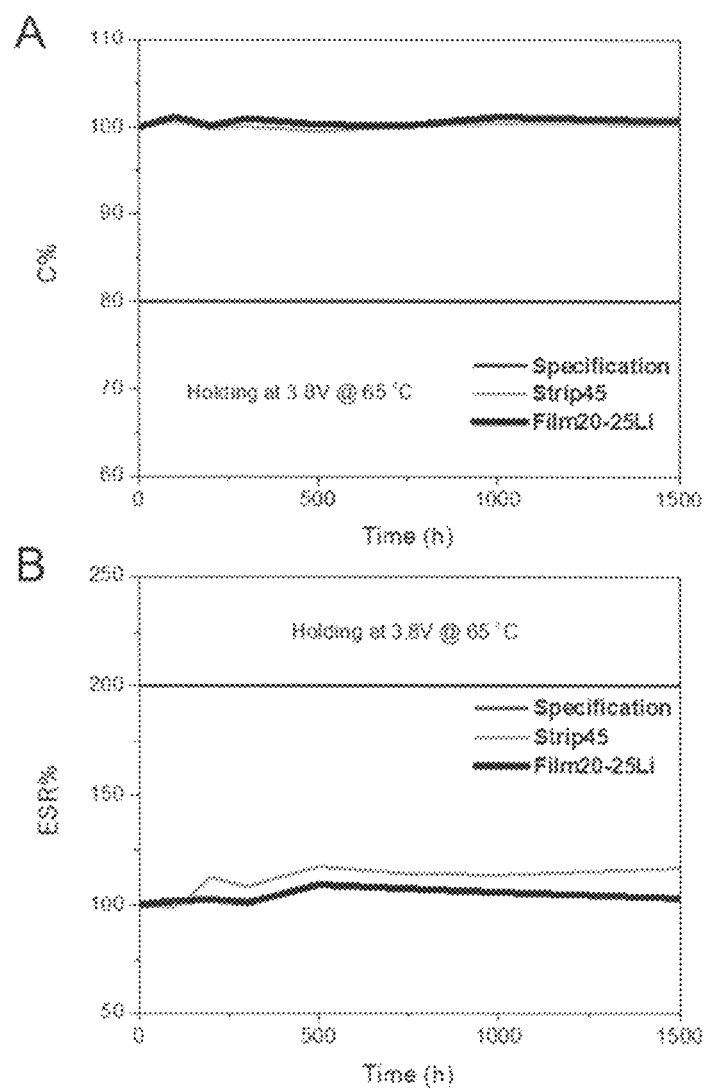
FIG. 14 depicts DC life test results of sandwich Li-ion capacitors with two different Li pre-lithiation methods (45 um Li strips and 20 um Li thin film having 25 holes), where: A. depicts Capacitance vs Time; and B. depicts ESR vs. Time.

The electrochemical impedance spectra (EIS) test was performed to the sandwich cells as shown in FIG. 13C to obtain the AC-ESR value. FIG. 13D is the enlarged figure of FIG. 13C, from which it is obvious that film cell (Film20-25Li) have smaller AC-ESR than Strip45. DC life tests were conducted by continuously constant-voltage charging cells at 3.8V in a 65 degrees' Celsius oven. Cells were placed in oven and taken out at certain time to record capacitance and ESR. Capacitance and ESR were tested in an operation voltage range of 2.2-3.8V with 570 mA charge-discharge current. In this research, capacitance and ESR were tested after operation for 100 h, 200 h, 300 h, 500 h, 750 h, 1000 h, and 1500 h. DC life performance of Strip45 and Film20-25Li were presented in FIG. 14. After continuously charging for 1500 h, both Strip45 and Film20-25Li can be maintained with stable capacitance and ESR.

Figure 15:
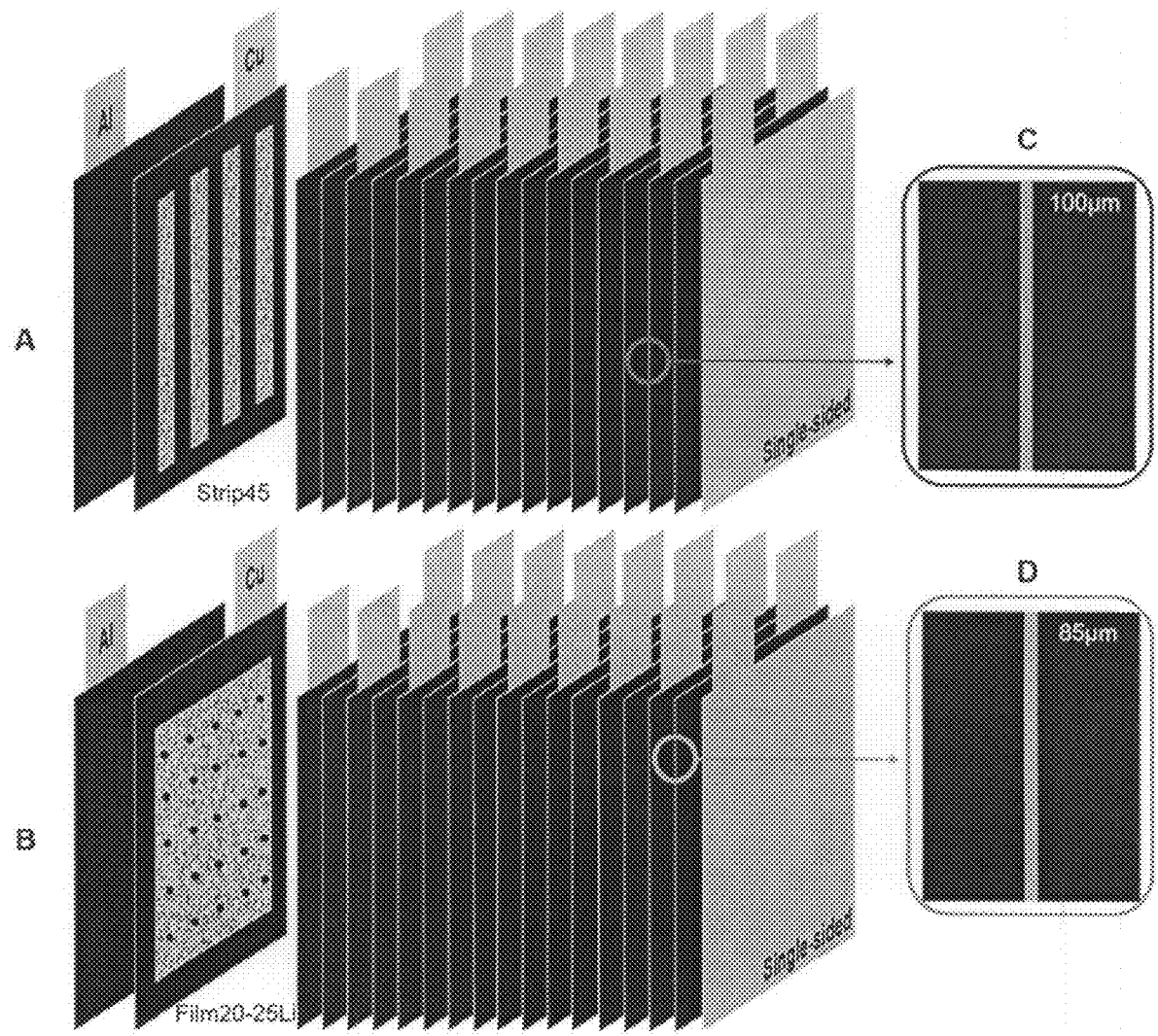
FIG. 15 depicts a schematic representation of: A. 200F LIC (9 NEs and 10 PEs) with 45 um Li Strips; B. 200F LIC (9 NEs and 10 PEs) with 20 um Li thin films having 25 holes; C. a cross section of PE; and D. a cross section of NE.

To form a 200F LIC, 9 NEs with pre-lithiation, 8 double-sided PE and 2 single-sided PE will be layered up with separator. FIG. 15 shows the structures of both Strip45 and Film20-25Li 200F LICs (separator was not drawn in the picture). Al and Cu metal were also used as current collectors for PEs and NEs. Thickness of activated carbon and hard carbon were the same. After soaked with organic electrolyte, cells were sent to do formation process.

Initial tests were conducted under 1C rate (80 mA) and 50C rate (4 A). Energy and power were calculated using weight and dimension of whole cells (taking into account the interference of cell case). Results are shown in Table 2, below. For Film20-25Li 200F LIC, capacitance has a 3.8%, increase comparing to Strip45, while ESR has a 16% drop. These changes result in 3-4% improvement in energy and ~20% in power. As shown in Table 2, Film20-25Li 200F LIC has reached high energy and power densities (26.9 Wh/L and 18.3 kW/L). That is to say, the present new pre-lithiation method with Li thin film having holes can not only facilitate the lithiation process but also excite the potential of electrodes.

Figure 16A:
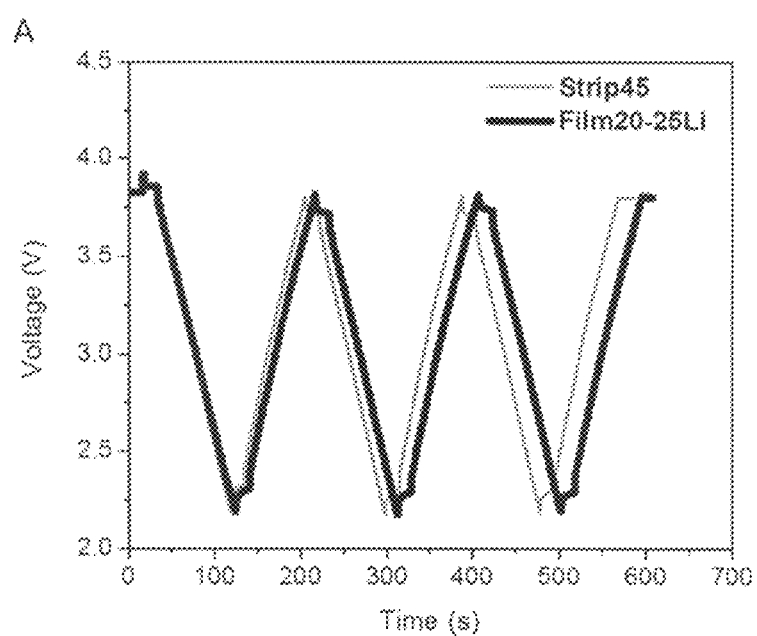
FIGS. 16A, 16B, 16C, 16D and 16E depict the following graphical representations: 16A a Charge-discharge profiles of 200F LICs with two different Li pre-lithiation methods at a constant current of 4 A from 2.2 to 3.8 V. Cycling performance of Strip45 and Film20-25Li capacitors under a constant current of 4 A charge-discharge from 3.8 to 2.2V; 16B capacitance; 16C ESR percentage change as a function of cycle number. DC life test results of Strip45 and Film20-25Li capacitors; 16D Capacitance vs. Time and 16E ESR vs. Time.
Figure 16B:
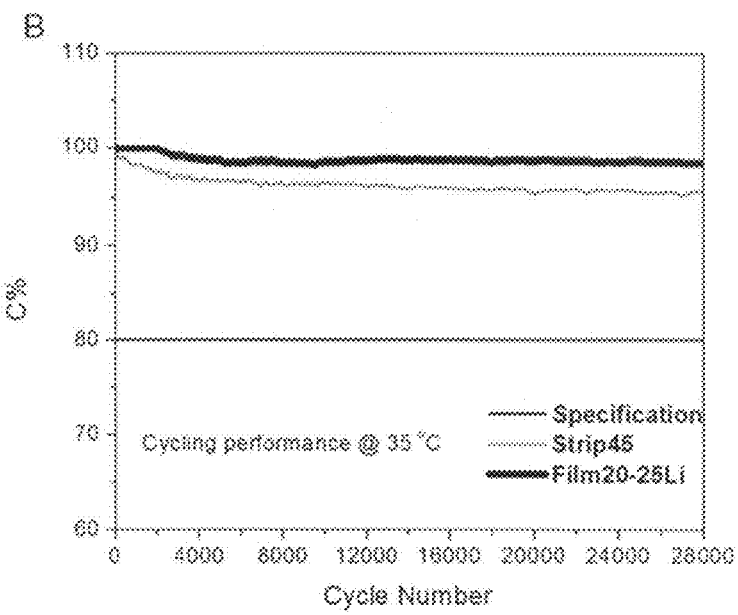
Figure 16C:
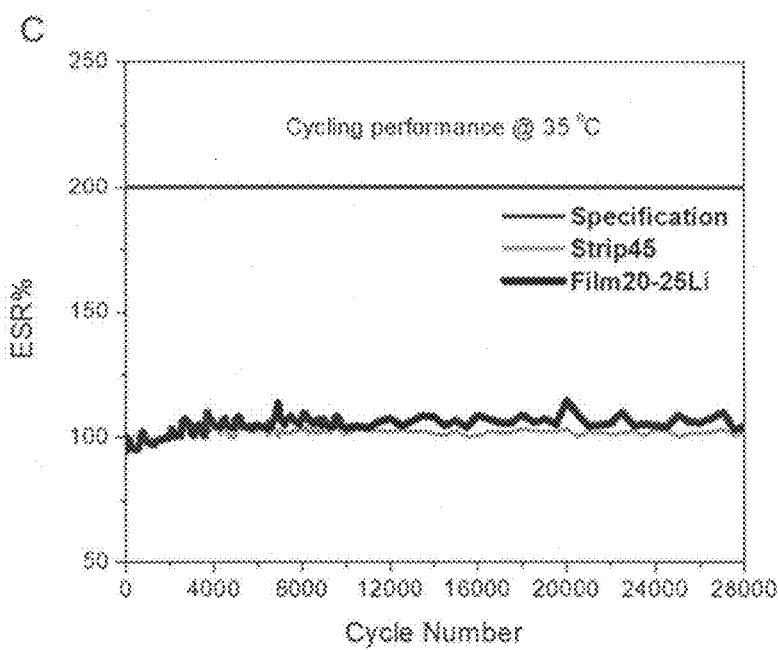
Figure 16D:
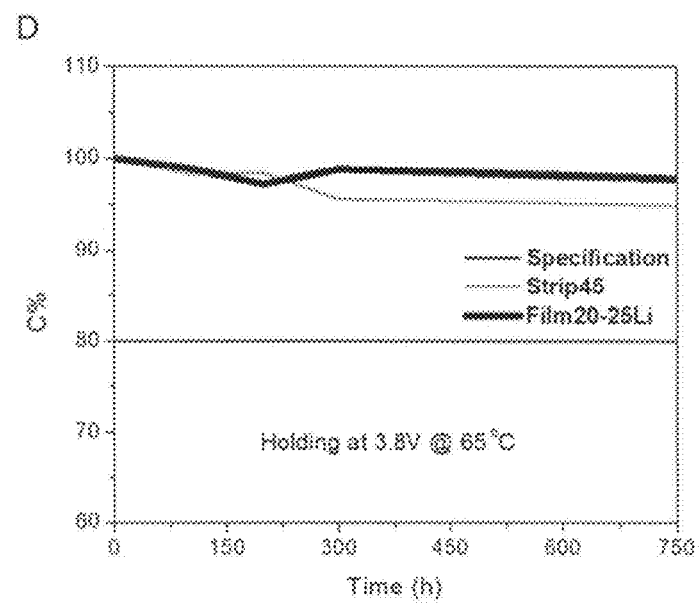
Figure 16E:
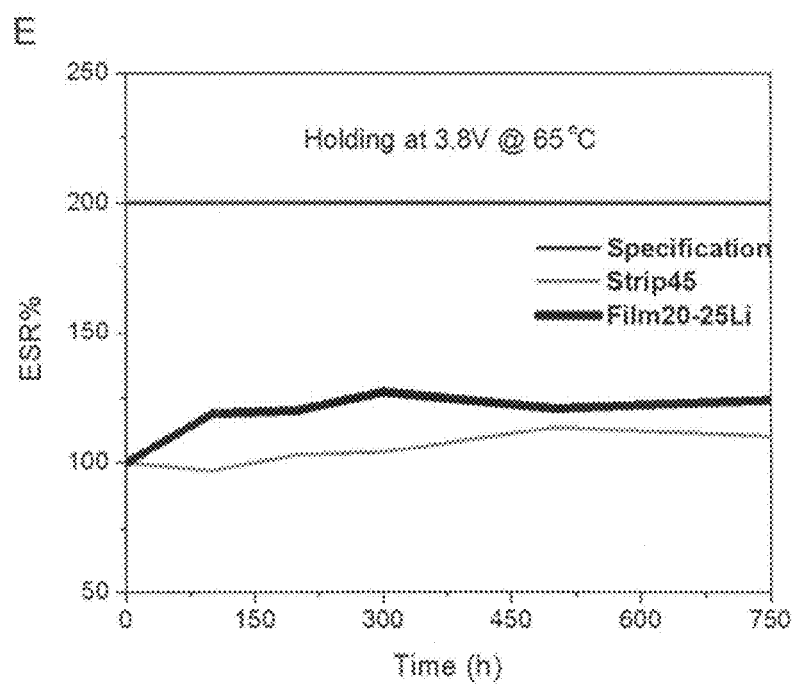

Cells' charge-discharge profile for 3 full cycles in the voltage range of 2.2-3.8V under a constant current of 4 A (50C rate) is displayed in FIG. 16A. Longer cycle time of Film20-25Li indicates that more electric energy can be stored in the LIC, therefore, higher capacitance can be reached. Cycle life and DC life testing was conducted under same voltage and temperature environment, however, all test results showing in FIGS. 16B-16E were tested under 4A charge-discharge current. From that, Film20-25Li 200F LIC can still maintain better performance than Strip45 cells. 28000 cycles have been reached and DC life has finished 750h constantly charging at 3.8V in 65 degrees C. environment.

TABLE 2

Summary of cells' initial tests for 200F LICs with 45 µm Li strips and 20 µm Li thin films.

| Cell Name | Li Form | C (F) | ESR (mOhm) | Specific Energy (Wh/kg) | Energy Density (Wh/L) | Max. Specific Power (kW/kg) | Max. Power Density (kW/L) |
|---|---|---|---|---|---|---|---|
| LIC200F-Strip | 45 µm strip | 237 | 23 | 14.8 | 25.8 | 8.7 | 15.1 |
| LIC200F-Film20-25Li | 20 µm film having 25 holes | 246 | 19 | 15.2 | 26.9 | 10.4 | 18.3 |
| Percentage Improved Compared Film 20-25Li with Strip45 | | 3.8% | −16.0% | 3.1% | 4.3% | 20.0% | 21.2% |

Conclusion of Example 1

In the present study, both LIC sandwich cells and 200F LIC cells were assembled using activated carbon as PEs and hard carbon as NEs. To investigate organic electrolyte soaking process, 2 different pre-lithiation methods were taken into this research. Hard carbon NEs with 45 µm Li strips (control sample) and 20 µm Li film with 25 tiny holes were placed in sandwich cells to firstly demonstrate the concept. Both sandwich cells have past 80,000-100,000 cycles tests now performed; Film 20-25Li was also proved to have an excellent DC life performance after 1500 h constantly voltage charging at 3.8 V under 65° C. After comparing Film20-25Li with Strip45 in 200F LICs, Film20-25Li 200F LIC shows a 3.8% increase in capacitance and a 16% decrease in ESR. Energy and power densities (26.9 Wh/L and 18.3 kW/L, based on weight and dimension of whole cell) can both achieve very high values. This research has provided strong evidence showing the advantages by using 20 µm thickness Li thin film having holes for pre-lithiation. Moreover, this research can also support the development of utilizing Li-ion capacitors in EVs in the future.

The Method for Negative Electrode Pre-Lithiation for Lithium-Ion Capacitors 50 shown in the drawings and described in detail herein disclose arrangements of elements of particular construction and configuration for illustrating preferred embodiments of structure and method of operation of the present application. It is to be understood, however, that elements of different construction and configuration and other arrangements thereof, other than those illustrated and described may be employed for providing a Method for Negative Electrode Pre-Lithiation for Lithium-Ion Capacitors 50 in accordance with the spirit of this disclosure, and such changes, alternations and modifications as would occur to those skilled in the art are considered to be within the scope of this design as broadly defined in the appended claims.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

We claim:

1. A method for lithium loaded electrode manufacturing for lithium-ion capacitors wherein a lithium loaded negative electrode is manufactured using lithium metal thin film having holes in a roll-to-roll process, comprising the steps of:
    (a) the manufacturing process should be done in a temperature and humidity controlled clean and dry room;
    (b) providing the negative electrode sheet and the top Li thin film having holes and bottom Li thin film having holes;
    (c) feed roll insertion of the bottom Li thin film having holes through tension control rolls and the lamination rolls;
    (d) feed roll and the insertion of the negative electrode sheet through the tension control rolls and into the lamination rolls;
    (e) feed roll insertion of the top Li thin film having holes through the tension rolls and into the lamination rolls; and
    (f) exertion of pressure on the lamination rolls and the extension of the laminated Li loaded negative electrode sheet through the tension control rolls and on to the take up roll to be completed and ready for use in Li-ion capacitors;
    wherein there is no adhesive drying time and no heat required on the lamination rolls, the pressure may be adjusted to a pressure range of from 40 to 400 kg/cm$^2$ as required to press the top Li thin film having holes and bottom Li foil thin film having holes into the negative electrode sheet and the gap between the top and bottom lamination rolls may be adjusted according to the laminated Li loaded negative electrode sheet requirements.

2. The method of lithium loaded electrode manufacturing for lithium-ion capacitors wherein a lithium loaded negative electrode is manufactured using lithium thin film having holes in a roll-to-roll process, according to claim 1, wherein the width range of said negative electrode is from 2 mm to 300 mm.

3. The method of lithium loaded electrode manufacturing for lithium-ion capacitors wherein a lithium loaded negative electrode is manufactured using lithium thin film having holes in a roll-to-roll process, according to claim 1, wherein the thickness range of said negative electrode is from 20 μm to 400 μm.

4. The method of lithium loaded electrode manufacturing for lithium-ion capacitors wherein a lithium loaded negative electrode is manufactured using lithium thin film having holes in a roll-to-roll process, according to claim 1, wherein the said negative electrode material includes graphite, hard carbon and soft carbon.

5. The method of lithium loaded electrode manufacturing for lithium-ion capacitors wherein a lithium loaded negative electrode is manufactured using lithium thin film having holes in a roll-to-roll process, according to claim 1, wherein the width range of said lithium films is from 2 mm to 300 mm.

6. The method of lithium loaded electrode manufacturing for lithium-ion capacitors wherein a lithium loaded negative electrode is manufactured using lithium thin film having holes in a roll-to-roll process, according to claim 5, wherein the area of the loaded thin Li film having holes is from 25% to 100% of the area of the negative electrode.

7. The method of lithium loaded electrode manufacturing for lithium-ion capacitors wherein a lithium loaded negative electrode is manufactured using lithium thin film having holes in a roll-to-roll process, according to claim 1, wherein the thickness range of said lithium films is from 2 μm to 50 μm.

8. The method of lithium loaded electrode manufacturing for lithium-ion capacitors wherein a lithium loaded negative electrode is manufactured using lithium thin film having holes in a roll-to-roll process, according to claim 7, wherein the mass ratio of the Li loading weight to the negative electrode active layer weight is from 3% to 20%.

9. The method of lithium loaded electrode manufacturing for lithium-ion capacitors wherein a lithium loaded negative electrode is manufactured using lithium thin film having holes in a roll-to-roll process, according to claim 1, wherein the area size percentage range of said holes in lithium films is from 0.01% to 75%.

10. The method of lithium loaded electrode manufacturing for lithium-ion capacitors wherein a lithium loaded negative electrode is manufactured using lithium thin film having holes in a roll-to-roll process, according to claim 1, includes a top lithium film and a bottom lithium film.

11. The method of lithium loaded electrode manufacturing for lithium-ion capacitors wherein a lithium loaded negative electrode is manufactured using lithium thin film having holes in a roll-to-roll process, according to claim 10, further includes a top lithium film and a bottom lithium film, wherein the locations of said top lithium film and said bottom lithium film are the same on each side of negative electrode.

* * * * *